US009188242B2

(12) United States Patent
Giove et al.

(10) Patent No.: US 9,188,242 B2
(45) Date of Patent: Nov. 17, 2015

(54) LOW DIFFUSIVITY BARRIER FLUID PACKING SYSTEM

(71) Applicant: Control Components, Inc., Rancho Santa Margarita, CA (US)

(72) Inventors: Fabio Giove, Bari (IT); Jalal Abrahimzadeh, Mission Viejo, CA (US)

(73) Assignee: Control Components, Inc., Rancho Santa Margarita, CA (US)

( * ) Notice: Subject to any disclaimer, the term of this patent is extended or adjusted under 35 U.S.C. 154(b) by 151 days.

(21) Appl. No.: 13/804,697

(22) Filed: Mar. 14, 2013

(65) Prior Publication Data

US 2013/0299008 A1 Nov. 14, 2013

Related U.S. Application Data

(60) Provisional application No. 61/644,269, filed on May 8, 2012.

(51) Int. Cl.

| F16K 31/14 | (2006.01) |
|---|---|
| F16J 15/18 | (2006.01) |
| F16K 51/00 | (2006.01) |
| F16K 41/00 | (2006.01) |
| F16K 41/02 | (2006.01) |
| F16J 15/32 | (2006.01) |

(52) U.S. Cl.
CPC .............. *F16K 51/00* (2013.01); *F16J 15/181* (2013.01); *F16J 15/186* (2013.01); *F16J 15/3296* (2013.01); *F16K 41/003* (2013.01); *F16K 41/02* (2013.01); *Y10T 137/4471* (2015.04)

(58) Field of Classification Search
CPC ....... F16K 51/00; F16K 41/003; F16K 41/02; F16J 15/181; F16J 15/186; F16J 15/3296; Y10T 137/4471
USPC ................... 251/214; 277/431, 510, 512, 513
See application file for complete search history.

(56) References Cited

U.S. PATENT DOCUMENTS

| 2,210,826 | A | * | 8/1940 | Williams ..................... 277/512 |
| 2,504,936 | A | * | 4/1950 | Payne ......................... 277/606 |
| 3,091,470 | A | * | 5/1963 | Anderson et al. ............. 277/512 |
| 4,340,204 | A | * | 7/1982 | Herd ............................ 251/327 |

(Continued)

OTHER PUBLICATIONS

International Search Report and Written Opinion for International Application No. PCT/US2013/038684; 12 pages.

*Primary Examiner* — Craig Schneider
*Assistant Examiner* — Minh Le
(74) *Attorney, Agent, or Firm* — Stetina Brunda Garred & Brucker

(57) ABSTRACT

In accordance with the present invention, there is provided a fluid or liquid barrier packing system which is adapted to minimize VOC emissions, while also providing live-loading and continuous load monitoring functions. The components of the packing system (including the liquid barrier) are adapted to be installed in a traditional stuffing box of a valve utilizing a top entry method, and without the necessity of having to inject the liquid through any side ports of the valve. The packing system reduces leakage levels as required by low emission leakage specifications by creating a reverse osmosis effect, limiting the diffusivity of a gas through the packing elements of the system. Thus, the packing system of the present invention provides a simplified method to load and monitor a barrier in the stuffing box of the valve to slightly higher pressure than processed fluid pressure.

20 Claims, 4 Drawing Sheets

(56) References Cited

U.S. PATENT DOCUMENTS

| | | | |
|---|---|---|---|
| 4,364,542 A * | 12/1982 | Meyer | 251/214 |
| 5,056,758 A | 10/1991 | Bramblet | |
| 5,299,812 A * | 4/1994 | Brestel et al. | 277/522 |
| 5,593,166 A * | 1/1997 | Lovell et al. | 277/516 |
| 5,607,165 A * | 3/1997 | Bredemeyer | 277/320 |
| 6,234,490 B1 * | 5/2001 | Champlin | 277/512 |
| 7,472,716 B2 * | 1/2009 | Gethmann | 137/15.18 |
| 8,613,423 B2 * | 12/2013 | Hutchens et al. | 251/214 |
| 8,632,053 B2 * | 1/2014 | Linser et al. | 251/214 |
| 2003/0214100 A1 * | 11/2003 | Pippert | 277/510 |
| 2004/0227302 A1 | 11/2004 | Burdick et al. | |
| 2005/0082766 A1 * | 4/2005 | Lovell et al. | 277/510 |
| 2008/0047616 A1 | 2/2008 | Lovell et al. | |

* cited by examiner

LOW DIFFUSIVITY BARRIER FLUID PACKING SYSTEM

CROSS-REFERENCE TO RELATED APPLICATIONS

The present application claims priority to U.S. Provisional Patent Application Ser. No. 61/644,269 entitled LOW DIFFUSIVITY BARRIER FLUID PACKING SYSTEM filed May 8, 2012.

STATEMENT RE: FEDERALLY SPONSORED RESEARCH/DEVELOPMENT

Not Applicable

BACKGROUND OF THE INVENTION

1. Field of the Invention

The present invention relates generally to valves and, more particularly, to a liquid barrier packing system adapted for integration into a valve and operative to satisfy very low fugitive emission leakage standards.

2. Description of the Related Art

In a typical valve construction, a valve stem may undergo a turning or sliding movement, or a combination of both movements, within its sleeve during the process of the valve moving between its open and closed configurations. In this regard, the sealing of the stem must be adequate to contend with such movement, while at the same time ensuring maintenance of fluid tightness against the pressure of the fluid flowing through the valve. A widely used type of stem sealing is a compression packing in which a gland or sleeve is used to apply a compressive force to a compression packing which surrounds a portion of the length of the stem. The resulting radial pressure of the packing onto the stem provides the desired seal so long as the radial pressure exceeds the pressure of fluid in the valve.

In certain valve configurations, compression may be applied to the packing through the use of packing bolts which are each attached at one end to a valve bonnet of the valve, and at their other end to a spigot, a flange or other projection bearing on, integral with or attached to the gland or sleeve which bears onto the packing. In this particular arrangement, the tightening of the bolts increases the pressure on the packing, thus facilitating the application of radial pressure onto the stem. In other valve configurations, it is known to attach a spring between the nut used to tighten the bolt and a surface of the spigot or flange. Although coil springs may be used, a conventional practice is to use Belleville springs which are essentially formed as a series of dished washers. These Belleville springs provide a "live-loaded" packing which can automatically compensate for changes that may take place in the packing under operating conditions of the valve, such as high pressures and temperatures. Since the volume of the packing material may reduce under certain operating conditions, or the temperature increase of the bolts and their further elongation may result in a load loss, the spring pressure compensates for such reduction and maintains the required pressure, thus avoiding potential harmful effects to the sealing of the stem in an unsprung valve which could result from the reduction in the packing material volume. Alternatively, if the volume of the packing material increases (which can happen with certain packing materials), the radial pressure of the stem in an unsprung valve could increase too much, thus possibly causing sticking of the stem. The spring value, however, can accommodate the pressure increase by means of further compression of the springs.

Recently, there has been an increasing level of demand in many oil and gas applications for the low level emission of Volatile Organic Compounds (VOC's). In this regard, in a typical oil and gas production and processing plant, control valves are generally considered to be the largest contributors to the loss of VOC's. This has resulted in the owners of many of these facilities developing strict fugitive emission specifications to minimize VOC leakage attributable to the valve stem packing, with allowable valve stem packing leakage rates being very low. Additionally, various laws enacted in Europe and other jurisdictions currently define the maximum concentration level of pollutants that can be detected in the air in an industrial setting, and proximate valves located therein. These laws and regulations are having the effect of forcing valve manufactures to adopt new designs for valve packing and sealing systems to comply with the same.

However, the packing system included in many valve designs, including those which include a live-loaded packing as described above, is still often susceptible to varying levels leakage about the valve stem. Though some solutions have been developed which make use of a barrier fluid, these particular solutions do not provide a live loaded system to maintain the barrier fluid pressure at a level higher than that of the process pressure, thus diminishing the longevity of the packing integrity once in service conditions (see, e.g., U.S. Pat. No. 7,118,114). In one existing barrier fluid solution, grease is laterally injected into a valve bonnet. However, in this particular solution, the grease is typically lost after repeated valve cycling, with its efficacy as a fluid barrier thus only being somewhat temporary unless replenished on a frequent basis. As will be recognized, a loss of efficacy of the grease as a fluid barrier prior to replenishment may result in undesirable leakage. Further, the attempted replenishment of the grease while the valve is still pressurized can jeopardize the integrity of the valve packing, thus creating a potential hazard to operators if high pressure gas escapes the valve bonnet. In addition, the use of the aforementioned lateral injection technique gives rise to the potential for lateral grease escape during the operation of the valve, thus creating a possible leak source. Still further, the aforementioned solution, as currently known, lacks modalities for detecting when the grease level is falling to an ineffective level. Other solutions are relatively complex to manufacture, assemble and service. Further, the existing solutions typically ignore the role of a seal to shaft interface in friction and seal wear, and the resultant impact on leakage levels.

The present invention addresses the problem of packing leakage as it relates to VOC's by providing a low diffusivity barrier fluid or liquid packing system which is configured to be accommodated by a traditional valve stuffing box, and is further adapted to minimize VOC emissions, while also providing live-loading and continuous load monitoring functions. These, as well as other features and attributes of the present invention will be discussed in more detail below.

BRIEF SUMMARY OF THE INVENTION

In accordance with the present invention, there is provided a fluid or liquid barrier packing system which is adapted to minimize VOC emissions, while also providing live-loading and continuous load monitoring functions. The components of the packing system (including the liquid barrier) are adapted to be installed in a traditional stuffing box of a valve utilizing a top entry method, and without the necessity of having to inject the liquid through any lateral side port(s)

within the bonnet of the valve. In this regard, the packing system of the present invention has a simplified construction and does not rely upon the use of external components, thus eliminating many of the complexities of prior art approaches, as well as the need for any external pumps to inject the fluid or liquid into the valve at high pressures. Further, the packing system of the present invention reduces leakage levels as required by low emission leakage standards and specifications by creating a reverse osmosis effect, limiting the diffusivity of a gas through the packing elements of the system. Thus, the packing system of the present invention provides a simplified method to load and monitor a barrier in the stuffing box of the valve to slightly higher pressure than processed fluid pressure.

As indicated above, the packing system of the present invention is provided with, among other things, live-loading and a continuous load monitoring system. The packing system also makes use of a valve stem having a hard coated and super-finish stem coating, and is specifically configured to reduce wear, friction on valve seals, and to further keep the packing under continuous load to satisfy very low fugitive emission leakage standards. The hard coated and super-finish stem coating of the valve stem used in conjunction with the packing system of the present invention is instrumental in reducing wear and friction of the seals. These features minimize packing leakage and barrier fluid loss resulting in significant leakage reduction, while at the same time increasing the longevity of the packing system once in service. In one embodiment of the present invention, spring live loading is installed into the stuffing box of the valve via a top entry method, thus reducing the number of components and facilitating ease of assembly.

The present invention is best understood in reference to the following detailed description when read in conjunction with the accompanying drawings.

BRIEF DESCRIPTION OF THE DRAWINGS

These, as well as other features of the present invention, will become more apparent upon reference to the drawings wherein.

Common reference numerals are used throughout the drawings and detailed description to indicate like elements.

DETAILED DESCRIPTION OF THE INVENTION

Figure 1:
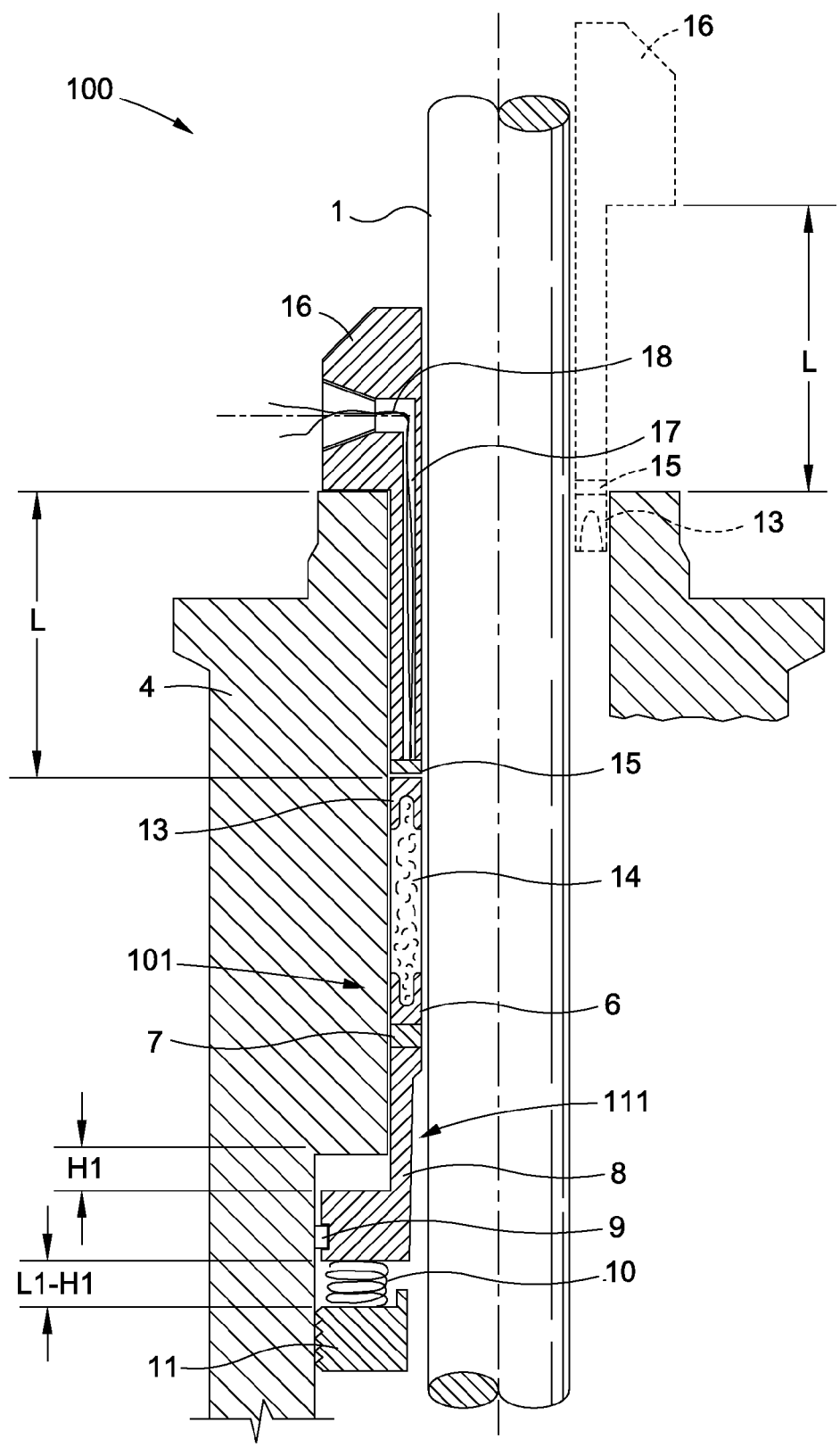
FIG. 1 is a partial cross-sectional view of a valve including a fluid packing system constructed in accordance with a first embodiment the present invention.
Figure 2:
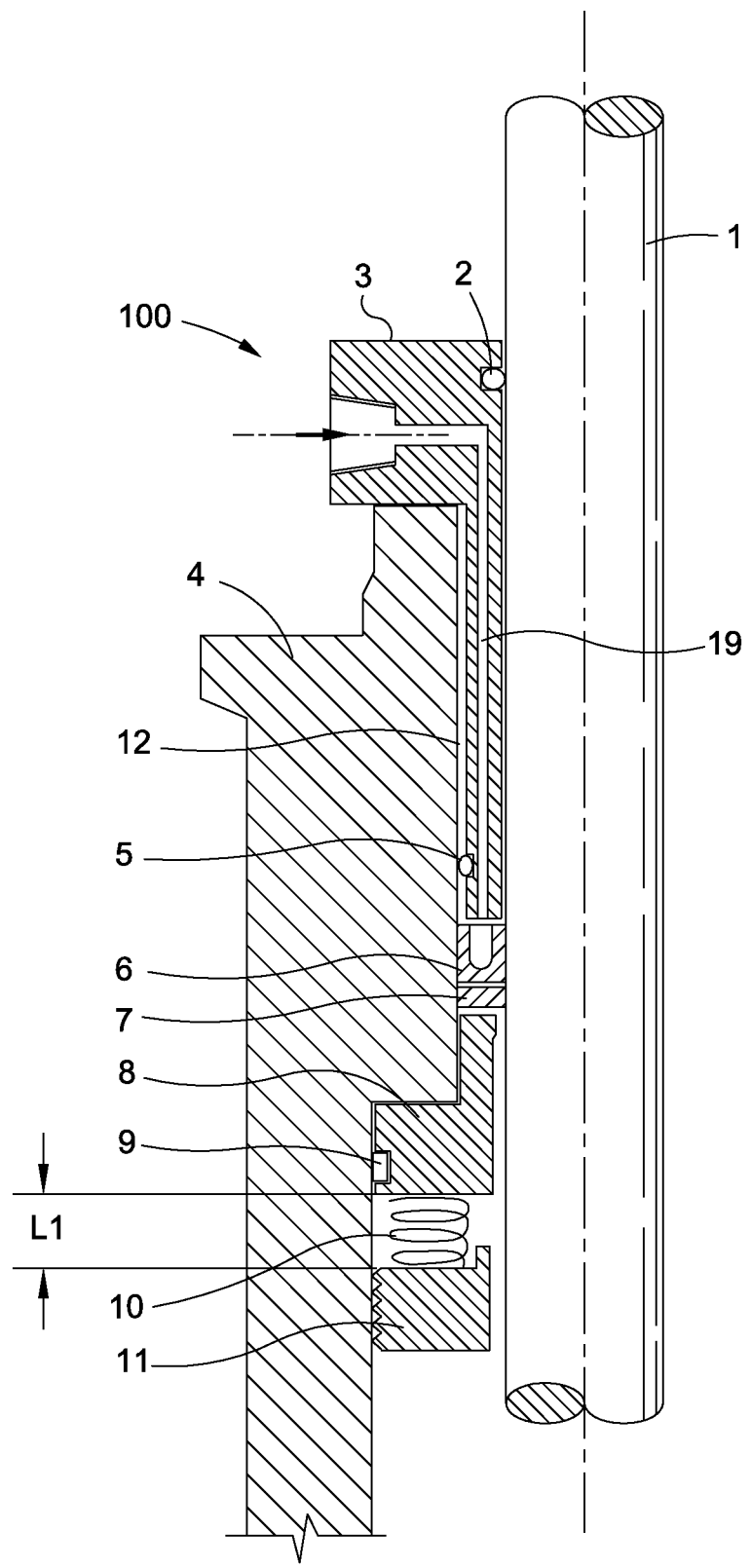
FIG. 2 is a partial cross-sectional view of the valve shown in FIG. 1 but depicting the fluid packing system of the first embodiment in a partially assembled state.

Referring now to the drawings wherein the showings are for purposes of illustrating preferred embodiments of the present invention only, and not for purposes of limiting the same, FIGS. 1 and 2 partially depict an exemplary valve 100 which includes a low fugitive emission, fluid or liquid barrier packing system 101 constructed in accordance with a first embodiment of the present invention. The exemplary valve 100 having the packing system 101 integrated therein possesses certain structural features. More particularly, the valve 100 includes a body, which itself comprises a valve bonnet 4. Extending axially through the valve bonnet 4 is a central passageway 12. As seen in FIGS. 1 and 2, the passageway 12 extending through the valve bonnet 4 is not of uniform inner diameter. Rather, the passageway 12 is divided into an upper section which is of the first inner diameter, and a lower section which is of a second inner diameter exceeding that of the upper section. As a result, the upper and lower sections of the passageway 12 are separated from each other by an annular shoulder. Advanced through the passageway 12 is elongate valve stem 1 of the valve 100, the reciprocal or rotary movement of which opens and closes the valve 100 in a conventional manner.

The valve stem 1 of the valve 100 is preferably provided with a hard coated and super-finish stem coating for reasons which will be discussed in more detail below. Additionally, as further seen in FIGS. 1 and 2, the diameter of the valve stem 1 is less than that of the upper section of the central passageway 12, such that an annular gap is normally defined between the valve stem 1 and that inner surface portion of the valve bonnet 4 defining the upper section of the central passageway 12.

The packing system 101 integrated into valve 100 resides within both the upper and lower sections of the passageway 12, with portions of the packing system 101 surrounding and exerting radial pressure against the valve stem 1. When viewed from the perspective shown in FIG. 1, the packing system 101 comprises an annular, upper packing 13 which circumvents the valve stem 1 and has a generally U-shaped cross-sectional configuration. The upper packing 13 is preferably fabricated from a material which is adapted to maintain a fluid tight seal against the outer surface of the valve stem 1 even upon the sliding movement of the valve stem 1 relative to the upper packing 13. In addition to the upper packing 13, the packing system 101 includes a lower packing 6 which is identically configured to, and may be fabricated from the same material as, the upper packing 13. As such, the lower packing 6 also circumvents the valve stem 1 and is operative to maintain a fluid tight seal against the outer surface of the valve stem 1 despite any sliding movement of the valve stem 1 relative thereto.

As further seen in FIG. 1, the upper and lower packings 13, 6 each reside within the upper section of the central passageway 12, and are disposed in spaced relation to each other such that annular channels defined by the upper and lower packings 13, 6 as a result of the U-shaped cross-sectional configurations thereof face each other. The upper and lower packings 13, 6 are also effectively compressed between the outer surface of the valve stem 1 and that interior surface of the valve bonnet 4 defining the upper section of the passageway 12 such that the upper and lower packings 13, 6 are each disposed in slidable, sealed engagement with the valve bonnet 4, in addition to being in slidable, sealed engagement with the valve stem 1.

The packing system 101 further comprises a fluid or liquid barrier 14 which is captured between the upper and lower packings 13, 6. More particularly, as seen in FIG. 1, the barrier 14 is disposed or filled into that portion of the annular gap between the valve stem 1 and valve bonnet 4 which is bounded by the upper and lower packings 13, 6. The migration of the barrier 14 beyond the upper and lower packings 13, 6 is prevented by the above-described fluid tight engagement between such upper and lower packings 13, 6 and each of the valve stem 1 and valve bonnet 4. In an exemplary embodiment of the present invention, the barrier 14 is a viscous liquid such as grease which is formulated to provide certain fluid sealing characteristics within a prescribed range of operating temperatures for a prescribed type of process fluid flowing through the valve 100.

Figure 3:
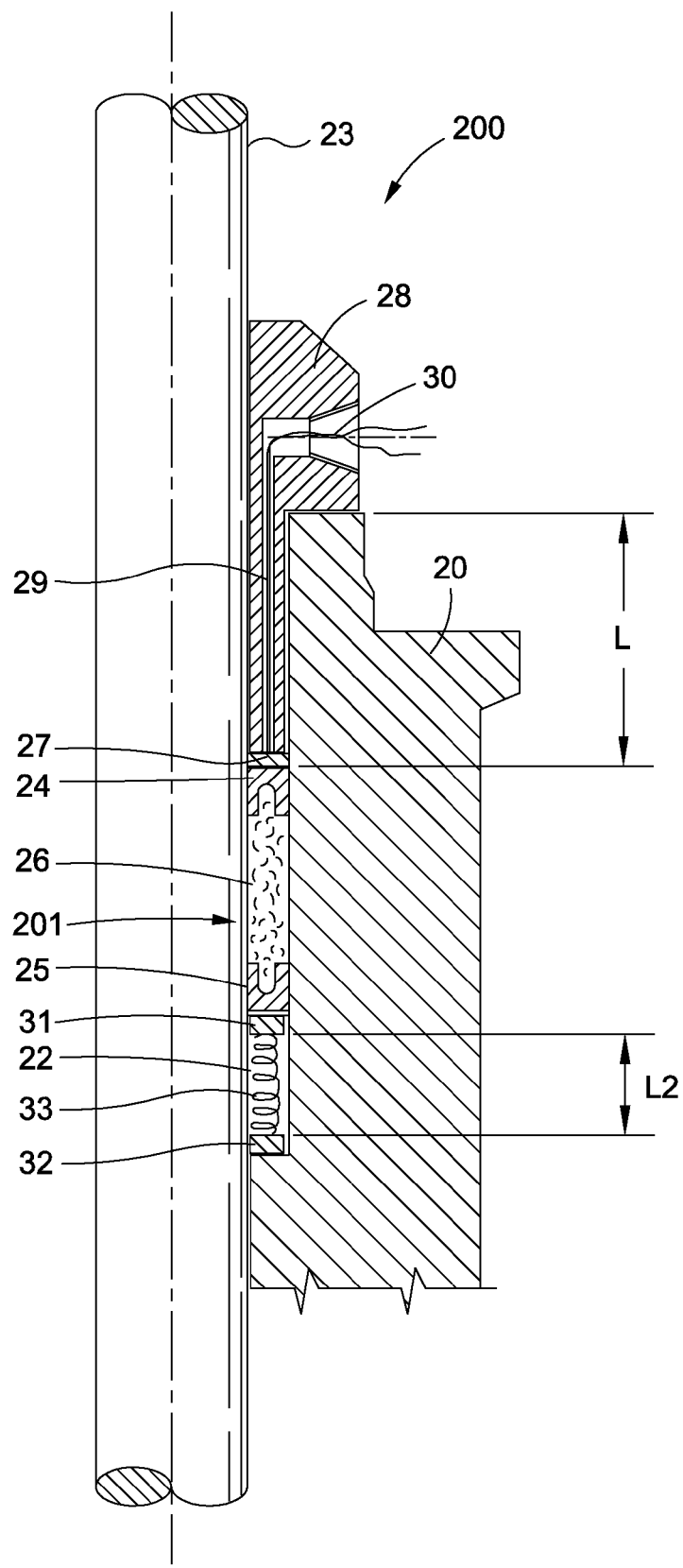
FIG. 3 is a partial cross-sectional view of a valve including a fluid packing system constructed in accordance with a second embodiment the present invention.

The packing system 101 further comprises an annular load sensor or load cell 15 which is positioned upon and directly abuts the upper packing 13. As such, the load cell 15 also resides within the upper section of the passageway 12 within the annular gap defined between the valve stem 1 and the valve bonnet 4. The load cell 15 is effectively captured between the upper packing 13 and a packing follower 16 which is also included in the packing system 101. As seen in and as viewed from the perspective shown in FIG. 1, the packing follower 16 includes an annular upper section which is of a first outer diameter, and a tubular lower section which protrudes from the upper section and is of a second outer diameter less than that of the first outer diameter of the upper section. As a result, the upper and lower sections of the packing follower 16 are separated by an annular shoulder. The lower section is also of the length L shown in FIG. 1. The packing follower 16 further defines a central bore which extends axially therethrough, and an ancillary passage 17. The valve stem 1 is slidably advanced through the central bore of the packing follower 16. Additionally, one end of the passage 17 terminates at the outer, peripheral surface of the upper section of the packing follower 16, with the opposite end terminating at the distal end or rim of the lower section thereof. The passage 17 is used to accommodate an electrical signal transfer wire 18 which extends from the load cell 15, through the packing follower 16, and hence to the exterior of the valve 100 as shown in FIG. 1. As will be recognized, the lower section of the packing follower 16 is dimensioned so that the same is capable of being slidably advanced into the upper section of the passageway 12 into the annular gap defined between the valve stem 1 and the valve bonnet 4. It is contemplated that the lower section of the packing follower 16 will normally be advanced into the upper section of the passageway 12 to a depth whereat the shoulder defined between the upper and lower sections of the packing follower 16 will be abutted against or disposed in close proximity to the top, distal end of the valve bonnet 4 as viewed from the perspective shown in FIG. 1 (and as also shown in FIG. 3 related to the second embodiment of the present invention).

The packing system 101 further comprises an annular lower spacer 7 which directly abuts the lower packing 6. As such, the spacer 7 also resides within the upper section of the passageway 12 within the annular gap defined between the valve stem 1 and the valve bonnet 4. The spacer 7 is effectively captured between the lower packing 6 and a tubular loading piston 8 which is also included in the packing system 101. As seen in and as viewed from the perspective shown in FIG. 1, the loading piston 8 includes a tubular upper section which is of a first outer diameter, and an annular lower section which is of a second outer diameter exceeding that of the first outer diameter of the upper section. As a result, the upper and lower sections of the loading piston 8 are separated by an annular shoulder. The loading piston 8 further defines a central bore which extends axially therethrough, and slidably accommodates the valve stem 1. Disposed in the peripheral outer surface of the lower section of the loading piston 8 is a continuous groove or channel which accommodates an annular bushing 9. The bushing 9 is sized and configured to be disposed in continuous, sliding contact with that interior surface of the valve bonnet 4 defining the lower section of the passageway 12. As seen in FIG. 1, the upper section of the loading piston 8 is dimensioned so that the same is capable of being slidably advanced into the upper section of the passageway 12 into the annular gap defined between the valve stem 1 and the valve bonnet 4. However, the size and configuration of the lower section of the loading piston 8 makes it incapable of being advanced into the upper section of the passageway 12, the lower section of the loading piston 8 thus being confined to the lower section of the passageway 12.

The packing system 101 further comprises an annular spring retainer 11 which circumvents the valve stem 1 and is constrained to a prescribed location within the lower section of the passageway 12. As further seen in FIG. 1, positioned and extending between the lower section of the loading piston 8 and the spring retainer 11 is at least one, and preferably a series of internal springs 10. When viewed from the perspective shown in FIG. 1, the spring(s) 10, are operative to normally bias the loading piston upwardly toward the top, distal end of the valve bonnet 4. In the packing system 101, the lower spacer 7, loading piston 8, spring(s) 10 and spring retainer 11 collectively define a live-loading sub-assembly 111 of the packing system 101 which is operative to maintain a prescribed level of compressive pressure on the upper and lower packings 13, 6 and the barrier 14 disposed therebetween.

Those of ordinary skill in the art will recognize that from the perspective shown in FIG. 1, the structural features of the valve 100 to the right side of the valve stem 1 (though not being fully shown) are essentially a mirror image of those shown to the left of the valve stem 1, the exception being that the packing follower 16 includes only the single ancillary passage 17 formed therein and extending therethrough. Additionally, in FIG. 1, the packing follower 16, the load cell 15 and the upper packing 13 are further shown in phantom to the right side of the valve stem 1 in non-final states of assembly prior to the advancement thereof to their preferred locations or orientations within the upper section of the central passageway 12. As previously explained, it is contemplated that in the valve 100 including the fully assembled packing system 101, the upper packing 13, the load cell 15 positioned thereon, and the lower section of the packing follower 16 will each reside within the upper section of the passageway 16 in the annular gap defined between the valve stem 1 and valve bonnet 4, with the shoulder defined between the upper and lower sections of the packing follower 16 abutting or being disposed in close proximity to the top, distal end of the valve bonnet 4.

During the operation of the valve 100 including the packing system 101, the combination of the upper and lower packings 13, 6 and the barrier 14 therebetween provides an effective, fluid-tight seal which prevents fluid migrating upwardly through the lower section of the passageway 12 from further migrating through the upper section of the passageway 12 and escaping the valve 100 via the top, distal end of the valve bonnet 4. Despite the reciprocal upward and downward or rotary movement of the valve stem 1 during the operation of the valve 100, the upper and lower packings 13, 6 and barrier 14 therebetween are essentially maintained in the orientation shown in FIG. 1, though the upper and lower packings 13, 6 are capable of some measure of slidable movement along that interior surface of the valve bonnet 4 defining the upper section of the passageway 12. Providing the valve stem 1 with the hard coated and super-finish stem coating reduces friction and thus premature wear of the upper and lower packings 13, 6 despite repeated cycles of the slidable movement of the valve stem 1 relative thereto.

In addition, despite increases or decreases in the volume of the barrier 14 and/or changes in the dimensional characteristics of the upper and lower packings 13, 6 resulting from changes in the operating condition of the valve (e.g., pressures and/or temperature changes), the fluid pressure of the barrier 14 is maintained above the process pressure of the fluid flowing through the valve 100 as a result of the live-loading thereof attributable to the above-described live-loading sub-assembly 111 comprising the lower spacer 7, loading piston 8, spring(s) 10 and spring retainer 11. As is apparent from FIG. 1, this live-loading sub-assembly 111, and in particular the loading piston 8 thereof, is capable of a range of movement roughly equal to that defined by the dimension H1 shown in FIG. 1. In the embodiment of FIG. 2, the loading piston 8 is depicted at the upward limit of its range of movement toward the top, distal end of the valve bonnet 4, such upward movement being limited by the abutment of the shoulder defined between the upper and lower sections of the loading piston 8 against the shoulder defined between the upper and lower sections of the central passageway 12. When the loading piston 8 is at its upward movement limit, the same is separated from the spring retainer 11 by a gap which accommodates the spring 10 and is of the height L1 shown in FIG. 2. Further, the load cell 15, which is captured between the upper packing 13 and packing follower 16 as described above, is operative to facilitate continuous load monitoring of the load applied to the seal collectively defined by the upper and lower packings 13, 6 and intervening barrier 14, thus providing an additional modality to monitor the integrity of such seal through verification of the fluid pressure of the barrier 14 exceeding the process pressure of the fluid pressure flowing through the valve 100.

In the valve 100, it is contemplated that the upper and lower packings 13, 6 of the packing system 101 may be fabricated from different materials rather than from the same material, may have the same or differing geometries. Over time, due to gas diffusivity into the upper and lower packings 13, 6, gas may further solubilize into the barrier 14. In the event this happens, the formation of the upper and lower packings 13, 6 from materials which impart the same tightness capacity may cause gas to escape from the upper packing 13 and migrate out of the valve 100, rather than escaping from the lower packing 6 which would normally result in the gas cause instead being directed back into the interior of the valve 100. In this regard, fabricating the lower packing 6 from a material imparting slightly less tightness in comparison to the upper packing 13 may be used to facilitate a back re-diffusion of barrier solubilized gas back into the interior of the valve 100.

FIG. 2 depicts the valve 100, and in particular the packing system 101 thereof as shown in FIG. 1, in a partially assembled state. More particularly, as shown in FIG. 2, with the live-loading sub-assembly of the packing system 101 being fully assembled, the lower spacer 7 being positioned upon the upper section of the loading piston 8, and the lower packing 6 being positioned upon the lower spacer 7, a liquid barrier filling device 3 is used to facilitate the introduction of the barrier 14 into the packing system 101. As seen in and as viewed from the perspective shown in FIG. 2, the filling device 3 is similarly configured to the packing follower 16, and includes an annular upper section which is of a first outer diameter, and a tubular lower section which protrudes from the upper section and is of a second outer diameter less than that of the first outer diameter of the upper section. As a result, the upper and lower sections of the filling device 3 are separated by an annular shoulder. The filling device 3 further defines a central bore which extends axially therethrough, and an ancillary passage 19. The valve stem 1 is slidably advanced through the central bore of the filling device 3. Additionally, one end of the passage 19 terminates at the outer, peripheral surface of the upper section of the filling device 3, with the opposite end terminating at the distal end or rim of the lower section thereof. Disposed within the inner surface of the upper section of the filling device 3 which partially defines the central bore thereof is a continuous groove or channel which accommodates an O-ring 2. Similarly, disposed within the outer surface of the tubular lower section of the filling device 3 is a continuous groove or channel which accommodates an O-ring 5.

As further seen in FIG. 2, the lower section of the filling device 3 is dimensioned so that the same is capable of being slidably advanced into the upper section of the passageway 12 into the annular gap defined between the valve stem 1 and the valve bonnet 4. When the filling device 3 is used to facilitate the introduction of the barrier 14 into the packing system 101, it is contemplated that the lower section of the filling device 3 will initially be advanced into the upper section of the passageway 12 to a depth whereat the shoulder defined between the upper and lower sections of the filling device 3 will be abutted against or disposed in close proximity to the top, distal end of the valve bonnet 4 as viewed from the perspective shown in FIG. 2. Upon such advancement, the O-ring 2 effectively creates a seal between the filling device 3 and the valve stem 1, with the O-ring 5 effectively creating a seal between the filling device 3 and the valve bonnet 4. Thereafter, the passage 19 of the filling device 3 is used to channel the barrier 14 from the exterior of the valve 100 to and above the lower packing 6.

After a prescribed amount of the barrier 14 has been introduced into the upper section of the passageway 12, the filling device 3 is completely retracted and withdrawn from within the passageway 12, and removed from the valve 100. Such retraction and removal of the filling device 3 is followed by the advancement of the upper packing 13 into the upper section of the passageway 12 to assume the orientation shown in phantom in FIG. 1. Subsequent to the load cell 15 being positioned upon the upper packing 13 while still in its position shown in phantom in FIG. 1, the packing follower 16 is then advanced over the valve stem 1 and used to effectively push the upper packing 13 and load cell 15 downwardly into the passageway 12 to the general orientations also shown in FIG. 1 wherein the upper packing 13 also comes into contact with the barrier 14 previously filled into the passageway 12. Those of ordinary skill in the art will recognize that the use of the filling device 3 is exemplary, and that the assembly of the packing system 101 within the valve 100 may potentially be accomplished through the use of alternative assembly techniques which do not entail the use of the filling device 3.

Figure 4:
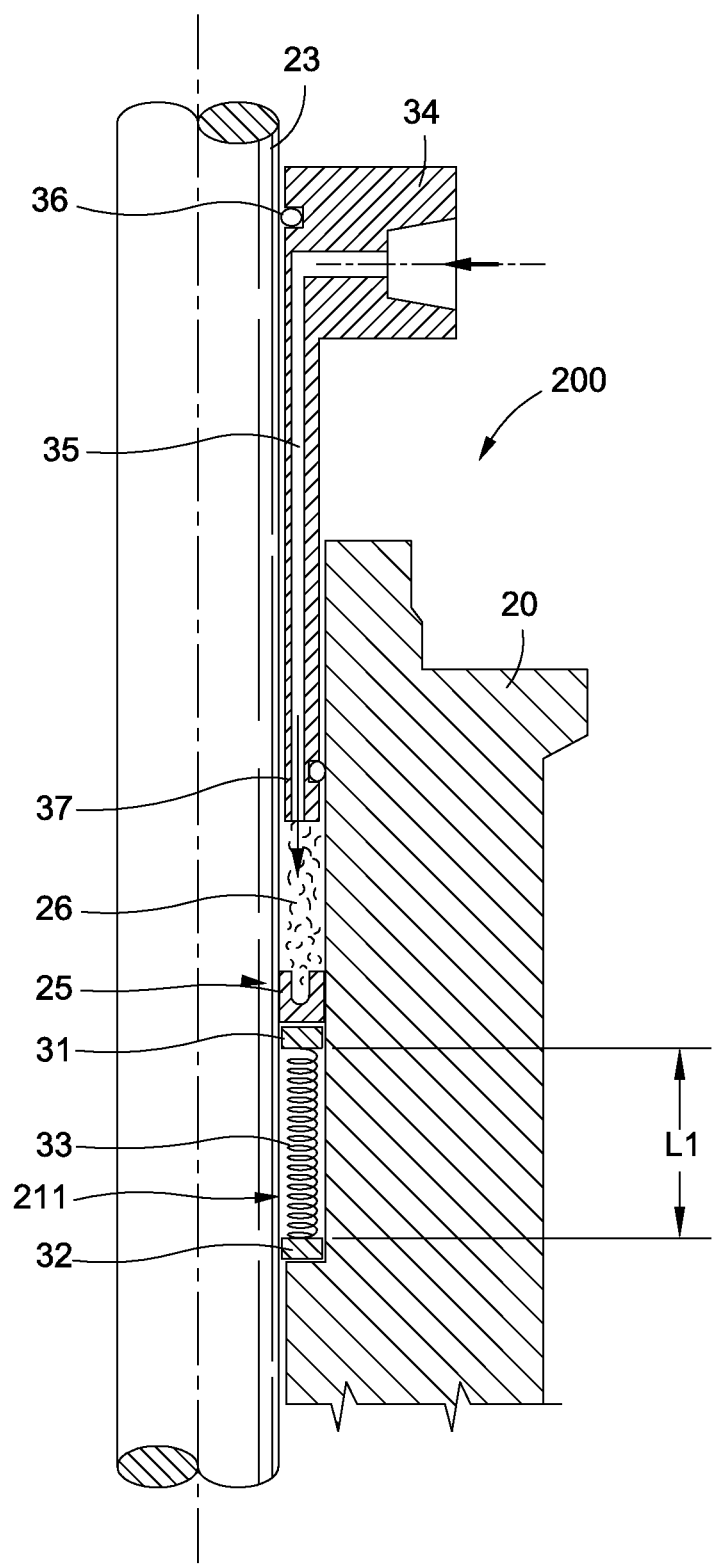
FIG. 4 is a partial cross-sectional view of the valve shown in FIG. 3 but depicting the fluid packing system of the second embodiment in a partially assembled state.

Referring now to FIGS. 3 and 4, there is partially depicted an exemplary valve 200 which includes a low fugitive emission, fluid or liquid barrier packing system 201 constructed in accordance with a second embodiment of the present invention. The exemplary valve 200 having the packing system 201 integrated therein possesses certain structural features. More particularly, the valve 200 includes a body, which itself comprises a valve bonnet 20. Extending axially through the valve bonnet 20 is a central passageway 22. As seen in FIGS. 3 and 4, the passageway 22 extending through the valve bonnet 20 is not of uniform inner diameter. Rather, the passageway 22 is divided into an upper section which is of the first inner diameter, and a lower section which is of a second inner diameter which is less than that of the upper section. As a result, the upper and lower sections of the passageway 22 are separated from each other by an annular shoulder. Advanced through the passageway 22 is elongate valve stem 23 of the valve 200, the reciprocal or rotary movement of which opens and closes the valve 200 in a conventional manner.

The valve stem 23 of the valve 200 is preferably provided with a hard coated and super-finish stem coating for reasons which will be discussed in more detail below. Additionally, as further seen in FIGS. 3 and 4, the diameter of the valve stem 23 is less than that of the upper section of the central passageway 22, such that an annular gap is normally defined between the valve stem 23 and that inner surface portion of the valve bonnet 20 defining the upper section of the central passageway 22.

The packing system 201 integrated into valve 200 resides solely within the upper section of the passageway 22, with portions of the packing system 201 surrounding and exerting radial pressure against the valve stem 23. When viewed from the perspective shown in FIG. 3, the packing system 201 comprises an annular, upper packing 24 which circumvents the valve stem 23 and has a generally U-shaped cross-sectional configuration. The upper packing 24 is preferably fabricated from a material which is adapted to maintain a fluid tight seal against the outer surface of the valve stem 23 even upon the sliding movement of the valve stem 23 relative to the upper packing 24. In addition to the upper packing 24, the packing system 201 includes a lower packing 25 which is identically configured to, and may be fabricated from the same material as, the upper packing 24. As such, the lower packing 25 also circumvents the valve stem 23 and is operative to maintain a fluid tight seal against the outer surface of the valve stem 23 despite any sliding movement of the valve stem 23 relative thereto.

As further seen in FIG. 3, the upper and lower packings 24, 25 each reside within the upper section of the central passageway 22, and are disposed in spaced relation to each other such that annular channels defined by the upper and lower packings 24, 25 as a result of the U-shaped cross-sectional configurations thereof face each other. The upper and lower packings 24, 25 are also effectively compressed between the outer surface of the valve stem 23 and that interior surface of the valve bonnet 20 defining the upper section of the passageway 22 such that the upper and lower packings 24, 25 are each disposed in slidable, sealed engagement with the valve bonnet 20, in addition to being in slidable, sealed engagement with the valve stem 23.

The packing system 201 further comprises a fluid or liquid barrier 26 which is captured between the upper and lower packings 24, 25. More particularly, as seen in FIG. 3, the barrier 26 is disposed or filled into that portion of the annular gap between the valve stem 23 and valve bonnet 20 which is bounded by the upper and lower packings 24, 25. The migration of the barrier 26 beyond the upper and lower packings 24, 25 is prevented by the above-described fluid tight engagement between such upper and lower packings 24, 25 and each of the valve stem 23 and valve bonnet 20. In an exemplary embodiment of the present invention, the barrier 26 is a viscous liquid such as grease which is formulated to provide certain fluid sealing characteristics within a prescribed range of operating temperatures for a prescribed type of process fluid flowing through the valve 200.

The packing system 201 further comprises an annular load sensor or load cell 27 which is positioned upon and directly abuts the upper packing 24. As such, the load cell 27 also resides within the upper section of the passageway 22 within the annular gap defined between the valve stem 23 and the valve bonnet 20. The load cell 27 is effectively captured between the upper packing 24 and a packing follower 28 which is also included in the packing system 201. As seen in and as viewed from the perspective shown in FIG. 3, the packing follower 28 includes an annular upper section which is of a first outer diameter, and a tubular lower section which protrudes from the upper section and is of a second outer diameter less than that of the first outer diameter of the upper section. As a result, the upper and lower sections of the packing follower 28 are separated by an annular shoulder. The lower section of the packing follower is also of the length L. The packing follower 28 further defines a central bore which extends axially therethrough, and an ancillary passage 29. The valve stem 23 is slidably advanced through the central bore of the packing follower 28. Additionally, one end of the passage 29 terminates at the outer, peripheral surface of the upper section of the packing follower 28, with the opposite end terminating at the distal end or rim of the lower section thereof. The passage 29 is used to accommodate an electrical signal transfer wire 30 which extends from the load cell 27, through the packing follower 28, and hence to the exterior of the valve 200 as shown in FIG. 3. As will be recognized, the lower section of the packing follower 28 is dimensioned so that the same is capable of being slidably advanced into the upper section of the passageway 22 into the annular gap defined between the valve stem 23 and the valve bonnet 20. It is contemplated that the lower section of the packing follower 28 will normally be advanced into the upper section of the passageway 22 to a depth whereat the shoulder defined between the upper and lower sections of the packing follower 28 will be abutted against or disposed in close proximity to the top, distal end of the valve bonnet 20 as shown in FIG. 3.

The packing system 201 further comprises an annular upper spacer 31 which directly abuts the lower packing 25. As such, the upper spacer 31 also resides within the upper section of the passageway 22 within the annular gap defined between the valve stem 23 and the valve bonnet 20. Also included in the packing system 201 is an annular lower spacer 32 which directly abuts the shoulder defined between the upper and lower sections of the passageway 22. As such, the lower spacer 32 also resides within the upper section of the passageway 22 within the annular gap defined between the valve stem 23 and the valve bonnet 20. As further seen in FIG. 1, positioned and extending between the upper and lower spacers 31, 32 is at least one, and preferably a series of internal springs 33. When viewed from the perspective shown in FIG. 1, the spring(s) 33, are operative to normally bias the upper spacer 31 upwardly toward the top, distal end of the valve bonnet 20. In the packing system 201, the upper and lower spacers 31, 32 and spring(s) 33 collectively define a live-loading sub-assembly 211 of the packing system 201 which is operative to maintain a prescribed level of compressive pressure on the upper and lower packings 24, 25 and the barrier 26 disposed therebetween.

Those of ordinary skill in the art will recognize that from the perspective shown in FIG. 3, the structural features of the valve 200 to the left side of the valve stem 23 (though not being shown) are essentially a mirror image of those shown to the right of the valve stem 23, the exception being that the packing follower 28 includes only the single ancillary passage 29 formed therein and extending therethrough. During the operation of the valve 200 including the packing system 201, the combination of the upper and lower packings 24, 25 and the barrier 26 therebetween provides an effective, fluid-tight seal which prevents fluid migrating upwardly through the lower section of the passageway 22 from further migrating through the upper section of the passageway 22 and escaping the valve 200 via the top, distal end of the valve bonnet 20. Despite the reciprocal upward and downward or rotary movement of the valve stem 23 during the operation of the valve 200, the upper and lower packings 24, 25 and barrier 26 therebetween are essentially maintained in the orientation shown in FIG. 3, though the upper and lower packings 24, 25 are capable of some measure of slidable movement along that interior surface of the valve bonnet 20 defining the upper section of the passageway 22. Providing the valve stem 23 with the hard coated and super-finish stem coating reduces friction and thus premature wear of the upper and lower packings 24, 25 despite repeated cycles of the slidable movement of the valve stem 23 relative thereto.

In addition, despite increases or decreases in the volume of the barrier 26 and/or changes in the dimensional characteristics of the upper and lower packings 24, 25 resulting from changes in the operating condition of the valve (e.g., pressures and/or temperature changes), the fluid pressure of the barrier 26 is maintained above the process pressure of the fluid flowing through the valve 200 as a result of the live-loading thereof attributable to the above-described live-loading sub-assembly 211 comprising the upper and lower spacers 31, 32, and spring(s) 33. As is apparent from FIGS. 3 and 4, this live-loading sub-assembly 211 is capable of a prescribed range of movement. In FIG. 4, the upper spacer 31 is depicted at the upward limit of its range of movement toward the top, distal end of the valve bonnet 20. In this instance, the upper and lower spacers 31, 32 are separated from each other by a gap which accommodates the spring(s) 33 and is of the height L1 shown in FIG. 4. Further, the load cell 27, which is captured between the upper packing 24 and packing follower 28 as described above, is operative to facilitate continuous load monitoring of the load applied to the seal collectively defined by the upper and lower packings 24, 25 and intervening barrier 26, thus providing an additional modality to monitor the integrity of such seal through verification of the fluid pressure of the barrier 26 exceeding the process pressure of the fluid pressure flowing through the valve 200. Additionally, in the valve 200, it is contemplated that the upper and lower packings 24, 25 of the packing system 201 may be fabricated from different materials to provide the same functional characteristics as described above in relation to the upper and lower packings 13, 6 of the packing system 101.

FIG. 4 depicts the valve 200, and in particular the packing system 201 thereof as shown in FIG. 3, in a partially assembled state. More particularly, as shown in FIG. 4, with the live-loading sub-assembly of the packing system 201 being fully assembled, and the lower packing 25 being positioned upon the upper spacer 31, a liquid barrier filling device 34 is used to facilitate the introduction of the barrier 26 into the packing system 201. As seen in and as viewed from the perspective shown in FIG. 4, the filling device 34 is similarly configured to the packing follower 28, and includes an annular upper section which is of a first outer diameter, and a tubular lower section which protrudes from the upper section and is of a second outer diameter less than that of the first outer diameter of the upper section. As a result, the upper and lower sections of the filling device 34 are separated by an annular shoulder. The filling device 34 further defines a central bore which extends axially therethrough, and an ancillary passage 35. The valve stem 23 is slidably advanced through the central bore of the filling device 34. Additionally, one end of the passage 35 terminates at the outer, peripheral surface of the upper section of the filling device 34, with the opposite end terminating at the distal end or rim of the lower section thereof. Disposed within the inner surface of the upper section of the filling device 34 which partially defines the central bore thereof is a continuous groove or channel which accommodates an O-ring 36. Similarly, disposed within the outer surface of the tubular lower section of the filling device 34 is a continuous groove or channel which accommodates an O-ring 37.

As further seen in FIG. 4, the lower section of the filling device 34 is dimensioned so that the same is capable of being slidably advanced into the upper section of the passageway 22 into the annular gap defined between the valve stem 23 and the valve bonnet 20. When the filling device 34 is used to facilitate the introduction of the barrier 26 into the packing system 201, it is contemplated that the lower section of the filling device 34 will initially be advanced into the upper section of the passageway 22 to a depth whereat the shoulder defined between the upper and lower sections of the filling device 34 will be abutted against or disposed in close proximity to the top, distal end of the valve bonnet 20 as viewed from the perspective shown in FIG. 4. Upon such advancement, the O-ring 36 effectively creates a seal between the filling device 34 and the valve stem 23, with the O-ring 37 effectively creating a seal between the filling device 34 and the valve bonnet 20. Thereafter, the passage 35 of the filling device 34 is used to channel the barrier 26 from the exterior of the valve 200 to and above the lower packing 25.

After a prescribed amount of the barrier 26 has been introduced into the upper section of the passageway 22, the filling device 34 is completely retracted and withdrawn from within the passageway 22, and removed from the valve 200. Such retraction and removal of the filling device 34 is followed by the advancement of the upper packing 24 into the upper section of the passageway 22. Subsequent to the load cell 27 being positioned upon the upper packing 24, the packing follower 28 is advanced over the valve stem 23 and used to effectively push the upper packing 24 and load cell 27 downwardly into the passageway 22 to the general orientations shown in FIG. 3 wherein the upper packing 24 also comes into contact with the barrier 26 previously filled into the passageway 22. Typically, the live loading sub-assembly 211 is concurrently compressed in a manner wherein the gap between the upper and lower spacers 31, 32 is reduced to the height L2 shown in FIG. 3 from the height L1 shown in FIG. 4. Those of ordinary skill in the art will recognize that the use of the filling device 34 is exemplary, and that the assembly of the packing system 201 within the valve 200 may potentially be accomplished through the use of alternative assembly techniques which do not entail the use of the filling device 34.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process may be implemented by one of skill in the art in view of this disclosure. For example, it is contemplated that the packing systems 101, 201 may each be used in conjunction with valves which have structural and functional features differing from those described above in relation to the valves 100, 200.

What is claimed is:

1. A valve adapted to satisfy low fugitive emission leakage standards, the valve comprising:
   a valve body defining a central passageway;
   a valve stem advanced through and reciprocally movable within the passageway;
   a packing system at least partially disposed within the passageway and including:
      an annular upper packing which circumvents the valve stem and is disposed in fluid tight engagement to the valve stem and the valve body;
      an annular lower packing which circumvents the valve stem and is disposed in fluid tight engagement to the valve stem and the valve body, the upper packing being separated from the lower packing by an annular gap which is further bounded by portions of the valve body and the valve stem;

a fluid barrier filled into the gap, the upper and lower packings and the fluid barrier collectively defining a seal of the packing system; and a live-loading sub-assembly cooperatively engaged to the seal and operative to apply a load thereto in a manner which maintains the fluid barrier thereof at a prescribed fluid pressure level; and an annular load sensor having a body which circumvents the valve stem and is positioned adjacent the upper packing.

2. The valve of claim 1 wherein the fluid barrier is a viscous liquid.

3. The valve of claim 1 wherein the live-loading sub-assembly of the packing system comprises:

a loading piston which circumvents the valve stem and is cooperatively engaged to the lower packing;

a retainer which circumvents the valve stem and is disposed in spaced relation to the loading piston; and at least one biasing spring extending between the loading piston and the retainer, and operative to normally bias the loading piston toward the seal.

4. The valve of claim 3 wherein the live-loading sub-assembly further comprises a spacer which circumvents the valve stem and is interposed between the loading piston and the lower packing.

5. The valve of claim 1 wherein the packing system further comprises:

a packing follower which circumvents the valve stem and is abutted against the body of the load sensor;

the load sensor being operative to monitor the load applied to the seal of the packing system by the live-loading sub-assembly.

6. The valve of claim 5 wherein the packing follower comprises:

an annular upper section which is of a first outer diameter and disposed exteriorly of the valve body;

a tubular lower section which protrudes from the upper section and is of a second outer diameter less than the first outer diameter, the lower section being slidably advanced into the passageway and abutted against the load sensor; and a central bore which extends through the upper and lower sections, and slidably accommodates the vale stem.

7. The valve of claim 6 wherein the packing follower further includes a passage which extends through the upper and lower sections thereof to the load sensor, the passage being sized and configured to accommodate at least one electrical wire extending from the load sensor.

8. The valve of claim 1 wherein the live-loading sub-assembly of the packing system comprises:

an upper spacer which circumvents the valve stem and is cooperatively engaged to the lower packing;

a lower spacer which circumvents the valve stem and is disposed in spaced relation to the upper spacer; and at least one biasing spring extending between the upper and lower spacers, and operative to normally bias the upper spacer toward the seal.

9. The valve of claim 1 wherein the upper and lower packings are independently moveable relative to the valve body in an axial direction and are identically configured to each other, and each have a generally U-shaped cross-sectional configuration and define a continuous, annular channel, the upper and lower packing being oriented relative to each other such that the channels thereof communicate with the gap.

10. A valve adapted to satisfy low fugitive emission leakage standards, the valve comprising:

a valve body;

a valve stem reciprocally movable relative to the valve body; and a packing system at least partially disposed within the valve body and including:

an upper packing which is disposed in fluid tight engagement to the valve stem and the valve body;

a lower packing which is disposed in fluid tight engagement to the valve stem and the valve body, the upper packing being separated from the lower packing by a gap which is further bounded by portions of the valve body and the valve stem;

a fluid barrier filled into the gap, the upper and lower packings and the fluid barrier collectively defining a seal of the packing system; and a live-loading sub-assembly cooperatively engaged to the seal and operative to apply a load thereto in a manner which maintains the fluid barrier thereof at a prescribed fluid pressure level; and a load sensor having a body which is abutted against the upper packing.

11. The valve of claim 10 wherein the fluid barrier is a viscous liquid.

12. The valve of claim 10 wherein the live-loading sub-assembly of the packing system comprises:

a loading piston which is cooperatively engaged to the lower packing;

a retainer which is disposed in spaced relation to the loading piston; and at least one biasing spring extending between the loading piston and the retainer, and operative to normally bias the loading piston toward the seal.

13. The valve of claim 12 wherein the live-loading sub-assembly further comprises a spacer which is interposed between the loading piston and the lower packing.

14. The valve of claim 10 wherein the packing system further comprises:

a packing follower which is abutted against the load sensor;

wherein the load sensor is operative to monitor the load applied to the seal of the packing system by the live-loading sub-assembly.

15. The valve of claim 14 wherein the packing follower comprises:

an upper section which is disposed exteriorly of the valve body;

a lower section which protrudes from the upper section which is slidably advanced into the passageway and abutted against the load sensor; and a central bore which extends through the upper and lower sections, and slidably accommodates the vale stem.

16. The valve of claim 15 wherein the packing follower further includes a passage which extends through the upper and lower sections thereof to the load sensor, the passage being sized and configured to accommodate at least one electrical wire extending from the load sensor.

17. The valve of claim 10 wherein the live-loading sub-assembly of the packing system comprises:

an upper spacer which is cooperatively engaged to the lower packing;

a lower spacer which is disposed in spaced relation to the upper spacer; and at least one biasing spring extending between the upper and lower spacers, and operative to normally bias the upper spacer toward the seal.

18. The valve of claim 10 wherein the upper and lower packings are identically configured to each other, and each have a generally U-shaped cross-sectional configuration and define a channel, the upper and lower packing being oriented relative to each other such that the channels thereof communicate with the gap.

19. A valve adapted to satisfy low fugitive emission leakage standards, the valve comprising:
   a valve stem; and
   a packing system including:
      an upper packing which is disposed in slidable, fluid tight engagement to the valve stem;
      a lower packing which is disposed in slidable, fluid tight engagement to the valve stem, the upper packing being separated from the lower packing by a gap;
      a fluid barrier filled into the gap, the upper and lower packings and the fluid barrier collectively defining a seal of the packing system; and
      a live-loading sub-assembly cooperatively engaged to the seal and operative to apply a load thereto in a manner which maintains the fluid barrier thereof at a prescribed fluid pressure level; and
      a load sensor having a body which is abutted against the upper packing.

20. The valve of claim 19 wherein the packing system further comprises:
   a packing follower which is abutted against the load sensor;
   wherein the load sensor is operative to monitor the load applied to the seal of the packing system by the live-loading sub-assembly.

\* \* \* \* \*